US005711109A

United States Patent [19]

Pitts

[11] Patent Number: 5,711,109
[45] Date of Patent: Jan. 27, 1998

[54] METHOD AND APPARATUS FOR RAISING PLANTS

[76] Inventor: Gary R. Pitts, 5025 E. Adams Ave., Fowler, Calif. 93625

[21] Appl. No.: 541,794

[22] Filed: Oct. 10, 1995

[51] Int. Cl.⁶ .......................... A01G 17/02; A01G 17/06
[52] U.S. Cl. .......................................... 47/58; 47/46
[58] Field of Search .......................................... 47/58, 46

[56] References Cited

U.S. PATENT DOCUMENTS

| P.P. 5,047 | 5/1983 | Garabedian | Plt./47 |
|---|---|---|---|
| 3,526,993 | 9/1970 | Siebol | 47/46 |
| 3,546,856 | 12/1970 | Hiyama | 56/1 |
| 3,585,756 | 6/1971 | Johnson | 47/58 |
| 4,336,667 | 6/1982 | Evans | 47/58 |
| 4,480,402 | 11/1984 | Hiyama et al. | 47/1 R |
| 5,144,768 | 9/1992 | Hiyama et al. | 47/46 |
| 5,337,514 | 8/1994 | Hiyama et al. | 47/44 |
| 5,411,561 | 5/1995 | Conley | 47/58 |
| 5,557,883 | 9/1996 | Walker | 47/46 |

FOREIGN PATENT DOCUMENTS 1586608  8/1990  U.S.S.R. .

OTHER PUBLICATIONS

Sun–Maid, The World's Favorite Raisin, Sun–Maid Growers of California. "Sun–Maid's D.O.V. Process" Kingsburg, California, U.S.A. (Feb. 1995).
Wilson, C.L., W.E. Loomis, and T.A. Steeves. Botany. New York: Holt Reinhart and Winston, 1971.
Gould et al. Mechanization of raisin production with the Irymple trellis system. Transactions of the ASAE. 30:56–60. 1987.

*Primary Examiner*—David T. Fox
*Assistant Examiner*—Melissa L. Kimball
*Attorney, Agent, or Firm*—Worrel & Worrel

[57] ABSTRACT

A method for raising plants which produce a crop on predetermined portions thereof, the method having steps of growing the plant in a growing medium in upstanding relation; and training the predetermined portions of the plant to grow along substantially discrete courses so that the predetermined portions are spaced from each other and from the growing medium so as to enhance the growth thereof and facilitate harvest of the crop. An apparatus for raising plants, such as grapevines and the like, each of which can be trained to grow at least one trunk, at least two cordons, a plurality of canes and a crop borne by the canes during a growing season and wherein the canes first grown in a first growing season do not produce a crop until a second growing season, the apparatus having a pair of first support members; a trellis structure mounting the first support members in spaced relation to each other above and individually laterally spaced relative to at least one of the plants grown in the earth and extending upwardly therefrom in upstanding relation; a pair of second support members; and trellis structure mounting the second pair of support members in spaced relation to each other above and individually laterally spaced relative the pair of first support members whereby at least two cordons can be trained individually to grow along the first support members and the canes produced by the two cordons can be trained individually to grow over and be supported by the second support members to produce the crop during a growing season.

11 Claims, 9 Drawing Sheets

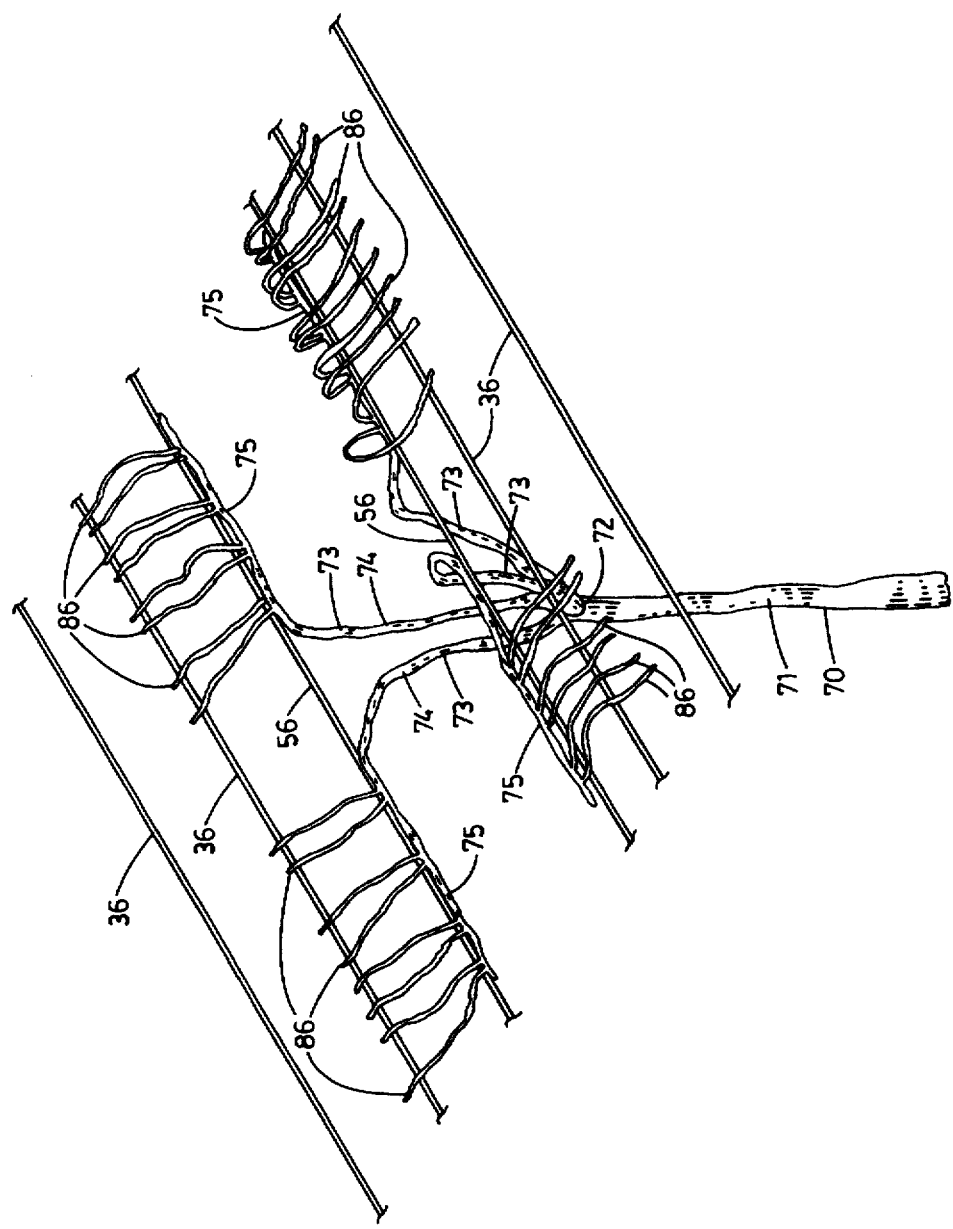

METHOD AND APPARATUS FOR RAISING PLANTS

BACKGROUND OF THE INVENTION

1. Field of the Invention

The present invention relates to a method and apparatus for raising plants and, more particularly, to such a method and apparatus which are uniquely well suited to the commercial production of crops which, because of their natural botanical characteristics of growth, are not conveniently adapted to such commercial production.

2. Description of the Prior Art

The commercial production of many farm crops is plagued with difficulties associated with the natural botanical characteristics of the plant life which produces such crops. In the case of many plant varieties, the natural growth patterns of the plants are inimical to such commercial production. Without the proper application of horticultural practices to alleviate, or minimize, the adverse consequences of unrestrained growth, the commercial production of certain crops would be entirely impractical.

For example, the commercial production of most varieties of grapes, raisins, currants and the like, is entirely dependent upon the successful application of such horticultural practices. The most obvious impediment to the commercial production of grapes and raisins is the proclivity for grapevines to random, uncontrolled growth. From antiquity, a variety of methods have been employed in an effort to control this growth in such a manner as to enhance the quality of the crop produced thereby, as well as to make the crop more accessible to harvest. Thus, grape arbors have been employed for, perhaps, thousands of years in an effort to achieve these and other purposes.

More recently, and particularly in those areas of the world where the commercial production of grapes has survived, the development of trellis systems of a wide variety of types has been a principal element in the success of such commercial production. The primary objective of such trellis systems is the management of the growth of the grapevines. This is in order to facilitate the application of such substances as irrigation water, fertilizers, insecticides, other materials and the like to the grapevines; to admit more light to the interior of the grapevines for such purposes as enhanced crop production, improved fruit coloration and the like; to aid in the ease with which the crop can be harvested; and to facilitate such other horticultural practices as pruning and weed control.

While many conventional trellis systems particularly adapted for grapevines and similar types of plant life have, to varying degrees, been successful in achieving some of these objectives, they have, for the most part, been of only marginal success. It is the applicant's belief that this results, in part, from an inadequate understanding of the natural botanical growth characteristics of grapevines and an inability to employ the known botanical characteristics to advantage in the development of a method of production which is fully practical and commercially successful.

Therefore, it has long been known that it would be desirable to have a method and apparatus for raising plants which are particularly well suited to the commercial production of such crops as grapes, raisins, currants and other commercial crops produced by plant life exhibiting a proclivity to random and uncontrolled growth; which employ the natural botanical growth characteristics of the plants themselves in such a manner as most beneficially to achieve the operational objectives desired; which facilitate the ease with which all of the horticultural practices required in the raising of such plants can be performed; which enhance the quality and commercial appeal of the crop produced thereby; which can be employed in existing as well as newly established vineyards; and which are otherwise entirely successful in achieving their operational objectives.

SUMMARY OF THE INVENTION

Therefore, it is an object of the present invention to provide an improved method and apparatus for raising plants.

Another object is to provide such a method and apparatus which are particularly well suited to the commercial production of such crops as grapes in large scale farming operations.

Another object is to provide such a method and apparatus which can be employed to convert the natural botanical growth patterns of such plants as grapevines and other plant life characterized by random uncontrolled growth to advantage in an entirely practical and commercially successful method and apparatus for use in raising the plants.

Another object is to provide such a method and apparatus which substantially improve upon the success with which crops such as grapes, raisins, currants and the like, can commercially be grown producing crops which are of superior quality at a reduced cost while possessing the capability of use in entirely new installations as well as being capable of retrofitting and usage in existing vineyards.

Another object is to provide such a method and apparatus which maximize the area of crop production within a given production area while avoiding the overdevelopment of such a production area which, using conventional methods, has countervailing consequences.

Another object is to provide such a method and apparatus which are entirely well suited to both manual and entirely automated farming techniques operating in all circumstances to enhance the effectiveness and efficiency with which such farming techniques can be employed.

Another object is to provide such a method and apparatus which avoid many of the adverse consequences experienced using conventional methods and apparatuses due to exposure to rain and other moisture; dust, dirt and other contaminants; as well as to insects and other pests.

Another object is to provide such a method and apparatus which, once established, require only limited training of laborers in the performance of the particular horticultural practices required in such a farming operation.

Another object is to provide such a method and apparatus which are uniquely well suited to raising table grapes and dried on the vine raisins making it possible to reduce the costs associated therewith to a level not heretofore achieved in the art.

Further objects and advantages are to provide improved elements and arrangements thereof in an apparatus for the purpose described which is dependable, economical, durable and fully effective in accomplishing its intended purposes.

These and other objects and advantages are achieved, in the preferred embodiment of the method and apparatus of the present invention, in a method for raising plants which produce a crop on predetermined portions thereof, the method including the steps of growing the plant in a growing medium in upstanding relation; and training the predetermined portions of the plant to grow along substantially discrete courses whereby the predetermined portions are spaced from each other and from the growing medium so as to enhance the growth thereof and facilitate harvest of the crop.

BRIEF DESCRIPTION OF THE DRAWINGS

FIG. 5C is a fragmentary perspective view of the grapevine of FIGS. 5A and 5B at a third stage of development in accordance with the method of the present invention.

DESCRIPTION OF THE PREFERRED EMBODIMENT

Figure 1:
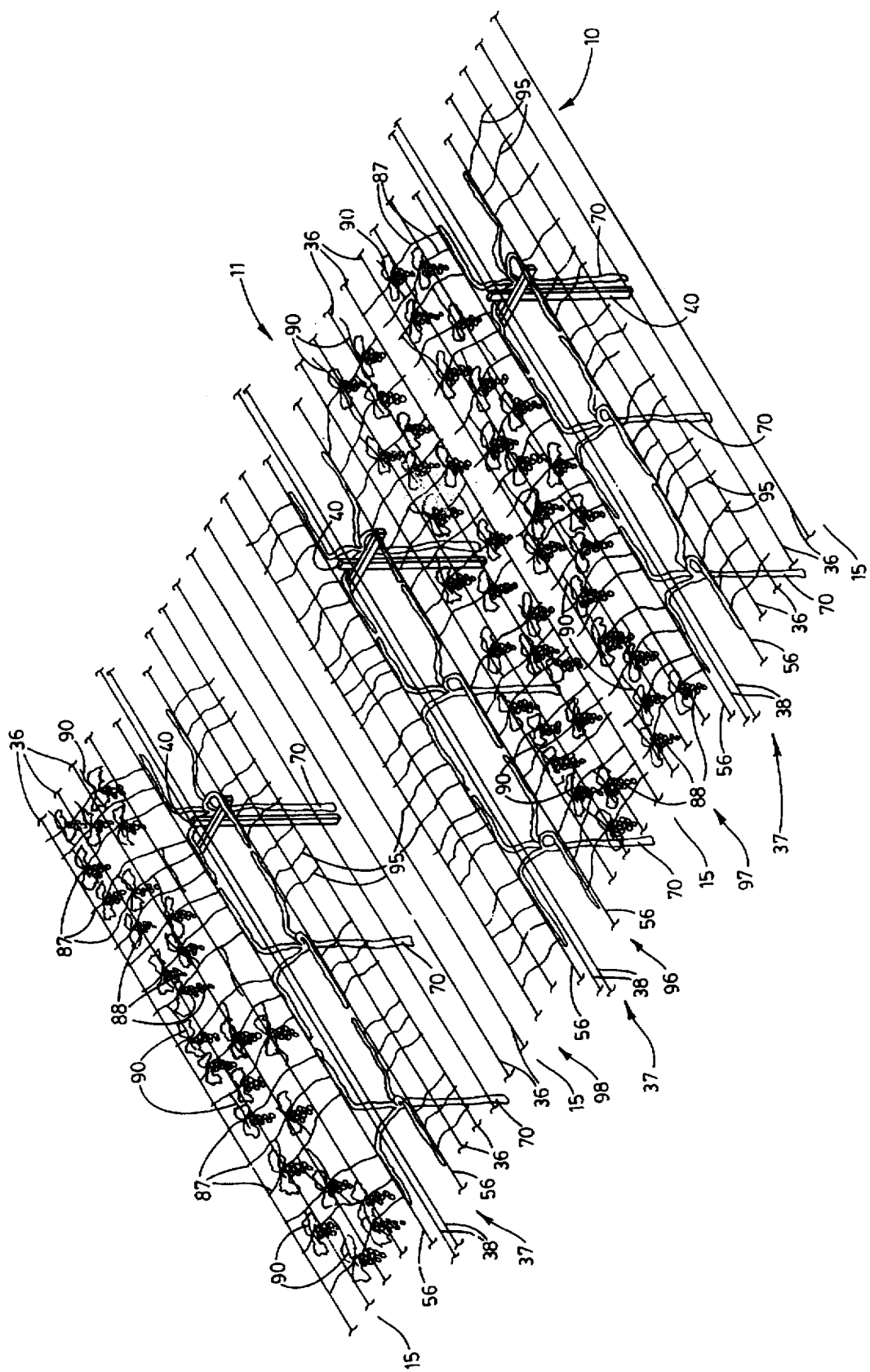
FIG. 1 is a fragmentary perspective view of a vineyard employing the method and apparatus of the present invention.

Referring more particularly to the drawings, the apparatus of the present invention is generally indicated by the numeral 10 in FIG. 1.

Figure 3:
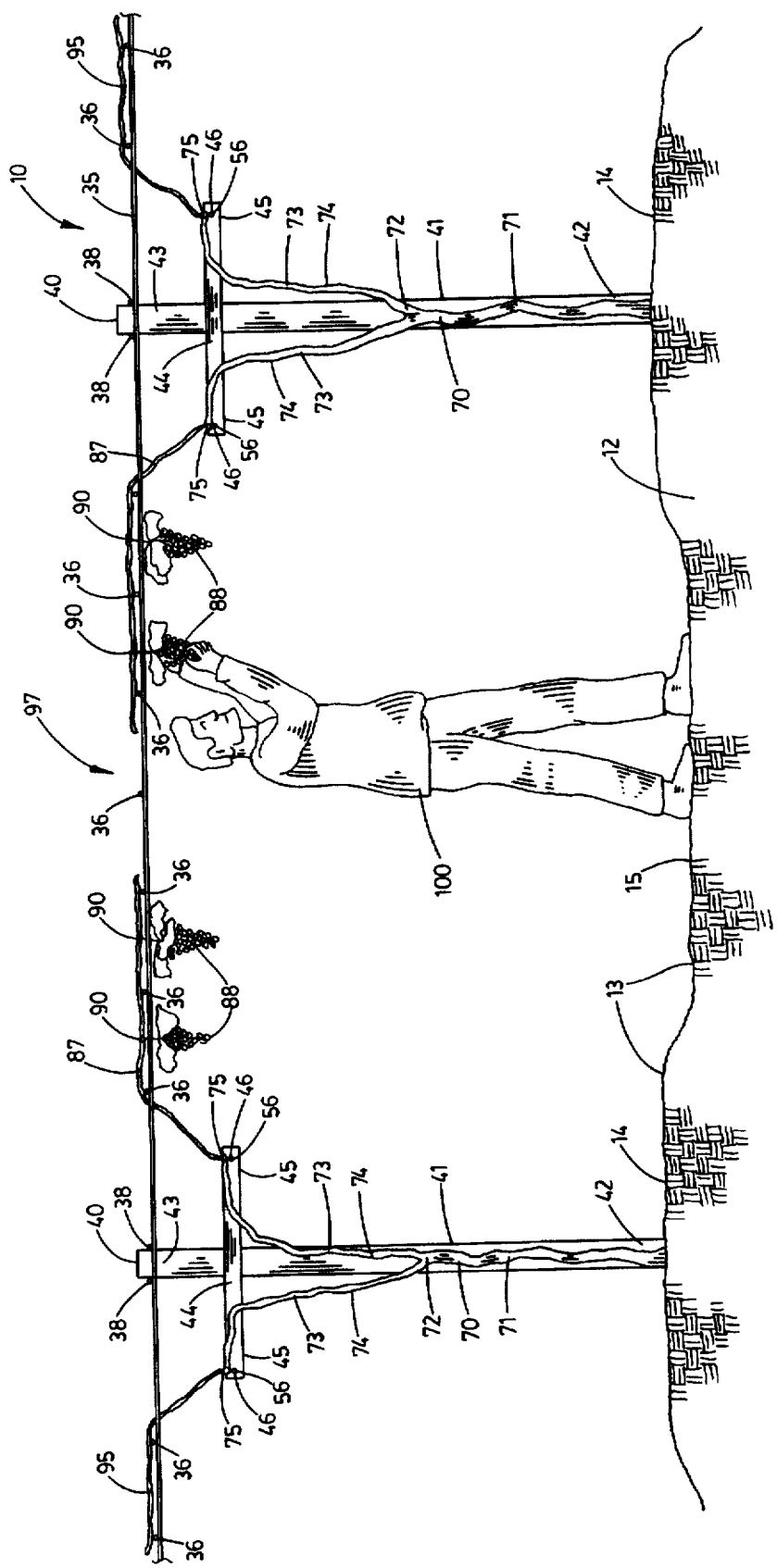
FIG. 3 is a somewhat enlarged, fragmentary transverse vertical section taken from a position indicated by line 3—3 in FIG. 2.

The apparatus 10 can be employed in a wide variety of operative embodiments, but has particular utility where employed, either as retrofitted or as a new installation, in a vineyard, such as generally indicated by the numeral 11 in FIG. 1. As shown therein, the earth is indicated by the numeral 12 while the earth's surface is indicated at 13. In accordance with conventional viticultural practices, the earth's surface, as shown in FIG. 3, has been leveled and graded to form a plurality of berms 14 extending through the vineyard in spaced, substantially parallel relation with adjoining berms separated from each other by an avenue or path 15. The berms 14 thus individually serve as planting areas for rows of grapevines, as will hereinafter be described in greater detail.

In the illustrative embodiment, the vineyard may be viewed as being composed of a particular variety of grapevines suited to the production of table grapes, or dried on the vine raisins. The method and apparatus have particular utility in the raising of varieties of grapevines grown for such crops. However, the method and apparatus have application to a wide variety of plant life and are not limited to any particular type of plant life.

Figure 2:
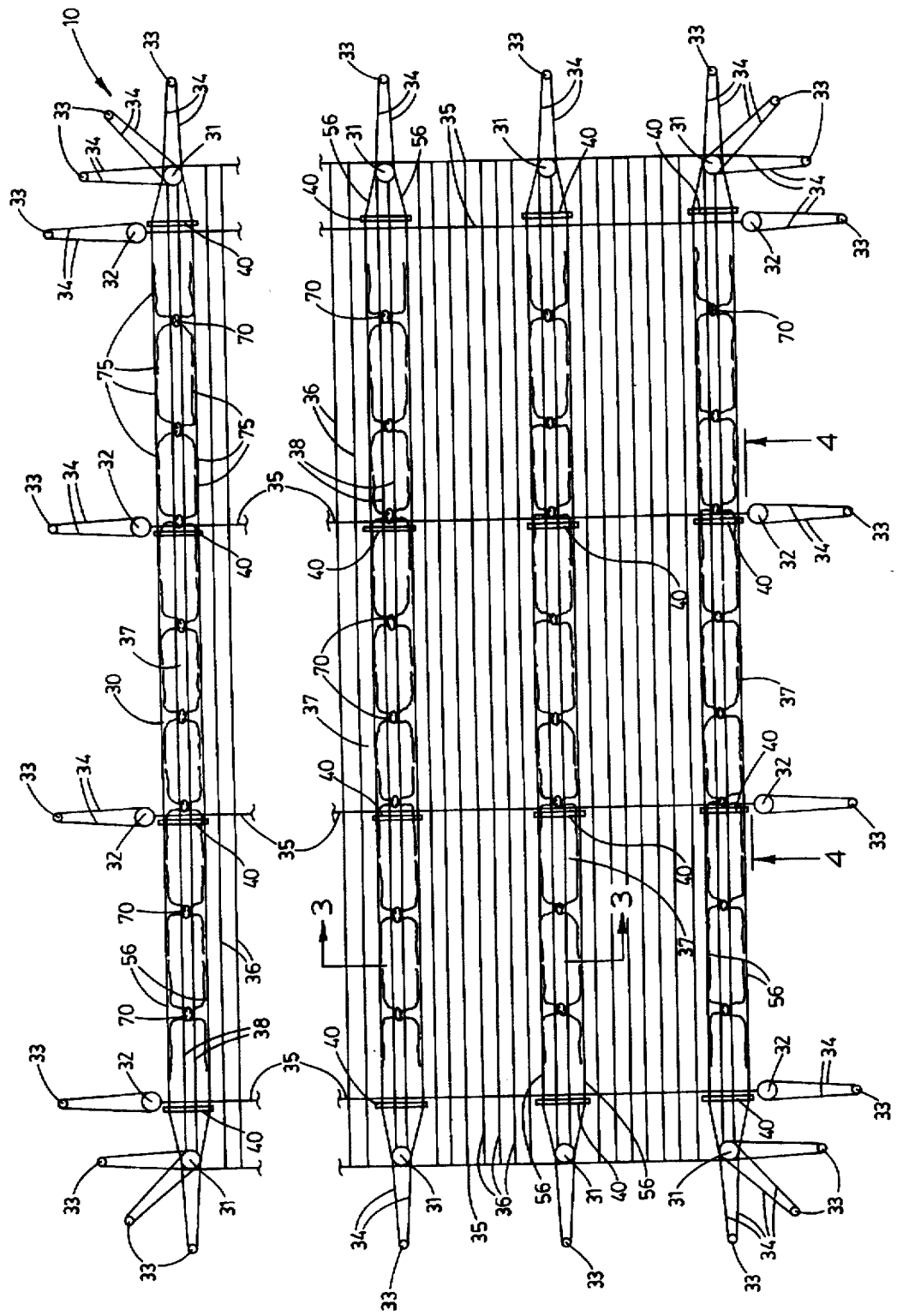
FIG. 2 is a fragmentary top plan view of a vineyard employing the method and apparatus of the present invention.

The apparatus 10 has a trellis structure generally indicated by the numeral 30 and perhaps best shown in its overall configuration in FIG. 2. The trellis structure is bounded at the opposite ends thereof by a plurality of main upright supports 31 mounted in the earth 12 in upstanding relation. The trellis structure is bounded along the lateral edges thereof by a plurality of lateral upright supports 32. The upright supports are arranged in a predetermined pattern and in spaced relation to each other forming a rectangular boundary for the trellis structure outwardly of the vineyard 11 and extending about the periphery thereof. The trellis structure can be of any desired size and is dependent only upon the size of the vineyard 11 over which it extends. The trellis structure shown in FIG. 2 is shown in the indicated relative size only for purposes of illustrative convenience. An anchor member 33 which can be, for example, a steel eye bolt, is mounted in the earth 12 in outwardly spaced relation to each of the upright supports, as shown in FIG. 2. High tension wires 34 interconnect each of the upright supports, from adjacent the upper end portion thereof, and its respective adjacent anchor member 33 thereby assisting in maintaining the upright support in the desired upright attitude so as securely to support the trellis structure.

As shown in FIG. 2, the lateral upright supports 32 are arranged in pairs aligned on opposite sides of the trellis structure. Each pair of lateral upright supports is interconnected by a main transverse cable 35 extending in tensioned relation therebetween and at a predetermined elevation above the earth's surface. The preferred heights of the main transverse cables may be visualized upon reference to FIG. 3. While the actual height can be as desired, in the illustrative embodiment the height of the main transverse cables above the earth's surface is seventy-eight inches (78").

The main transverse cables 35 extend transversely of the trellis structure 30 in spaced, substantially parallel relation to each other. The main transverse cables are interconnected by and support a multiplicity of overhead trellis wires 36 extending from the main transverse cable 35 on the far left, as viewed in FIG. 2, to the main transverse cable on the far right, as viewed therein. The overhead trellis wires are disposed in rested relation on the main transverse cables therebetween, as shown in FIG. 3.

It will be understood that the vineyard 11 has a plurality of rows 37 extending in spaced, substantially parallel relation to each other from the far left to the far right, as shown in FIG. 2, between and aligned with the main upright supports 31 of each pair. Adjacent rows 37 within the vineyard are preferably spaced a distance such as, for example, one hundred and forty-four inches (144") between the centerlines of the rows. The main upright supports 31 are interconnected by a pair of rake or control wires 38 extending parallel to each other on corresponding opposite sides of their respective main upright supports and preferably in the same horizontal plane as the trellis wires 36.

Figure 4:
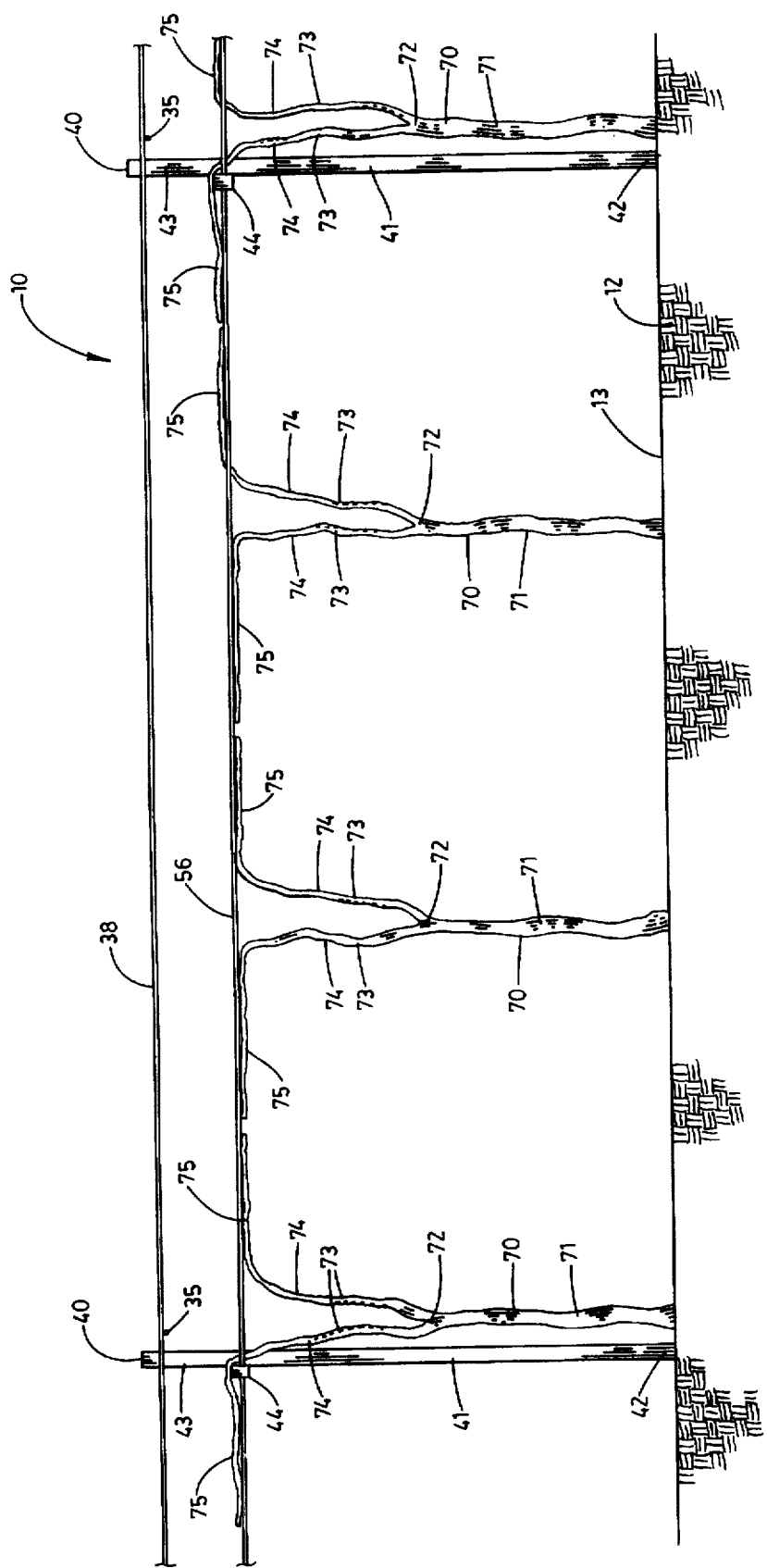
FIG. 4 is a somewhat enlarged, fragmentary longitudinal vertical section taken from a position indicated by line 4—4 in FIG. 2.

The apparatus 10 has a multiplicity of trellis frames 40, hereinafter to be described. Referring more particularly to FIGS. 3 and 4, each of the trellis frames has a vertical member 41, which can be constructed of wood, steel, or any other suitable material, mounted in the earth 12 in a predetermined position. The vertical member extends in vertical relation upwardly from the earth's surface 13, centered relative to its respective berm 14 and row 37. The vertical member has a lower end portion 42 mounted in the earth and an opposite upper end portion 43 which extends to a predetermined elevation which, in the illustrative embodiment is seventy-eight inches (78") above the row. The upper end portion of each vertical member is positioned so as to extend between the control wires 38, as shown in FIG. 3. A cross or horizontal member 44 is mounted on and extends in right angular relation to the vertical member in spaced relation to the upper end portion 43. More particularly, in the illustrative embodiment the horizontal member is mounted in the described position sixty-six inches (66") above the earth's surface. The horizontal member can similarly be constructed of any suitable material, such as wood, steel or the like. The horizontal member has opposite end portions 45 through which holes 46 individually extend in predetermined positions.

As shown in FIG. 2, the trellis frames 40 are aligned in predetermined spaced relation within their respective rows 37 extending generally from left to right as viewed in FIG. 2. The trellis frames in each row are aligned longitudinally of their respective rows with the horizontal members 44 thereof extending transversely of the rows 37 and disposed so as to define a common horizontal plane. Similarly, corresponding holes 46 of the horizontal members are aligned to define parallel courses on opposite sides of the center line of the row. A pair of lower trellis wires 56 interconnect the main upright supports 31 at the opposite ends of each row 37 and extending from left to right, as viewed in FIG. 2. The lower trellis wires are individually extended through corresponding holes 46 at the opposite end portions 45 of the horizontal members 44 within their respective row and are tensioned so as to be taught.

In the illustrative embodiment, a plurality of grapevines 70 are grown within the earth 12 aligned within the berm 14 of their respective row 37 in predetermined, spaced relation to each other extending along the centerline of the row. The grapevines are spaced a predetermined common distance such as, for example, eight feet (8'). This spacing can best be visualized upon reference to FIGS. 2 and 4. Each of the grapevines 70 has an upstanding trunk 71 which extends to a crown 72 constituting, in effect, the top of the trunk.

TRANSITIONAL PHASE

In accordance with the method of the present invention, the grapevines 70 within the vineyard 11 can either be new plantings or existing grapevines and, as noted, may be of any desired variety. In any case, the grapevines must be trained in a transitional phase, in accordance with the method of the present invention, until the grapevines reach a form for continued practice of the method from growing season to growing season thereafter. This training process requires two growing seasons to complete and three growing seasons to extend from the beginning of such training through one full cycle of practice of the method.

The conversion of the grapevines 70 to the form required for full practice of the method of the present invention may most easily be visualized by reference to FIGS. 5A, 5B, 5C, 5D and 5E. For illustrative convenience, the same grapevine 70 is shown in each of these views with each successive view showing a next successive stage of training in accordance with the method of the present invention. Prior to the grapevine reaching the form shown in FIG. 5A, it is pruned to the crown 72 thereof, or to the point at which the portions hereinafter to be described are in place.

Figure 5A:
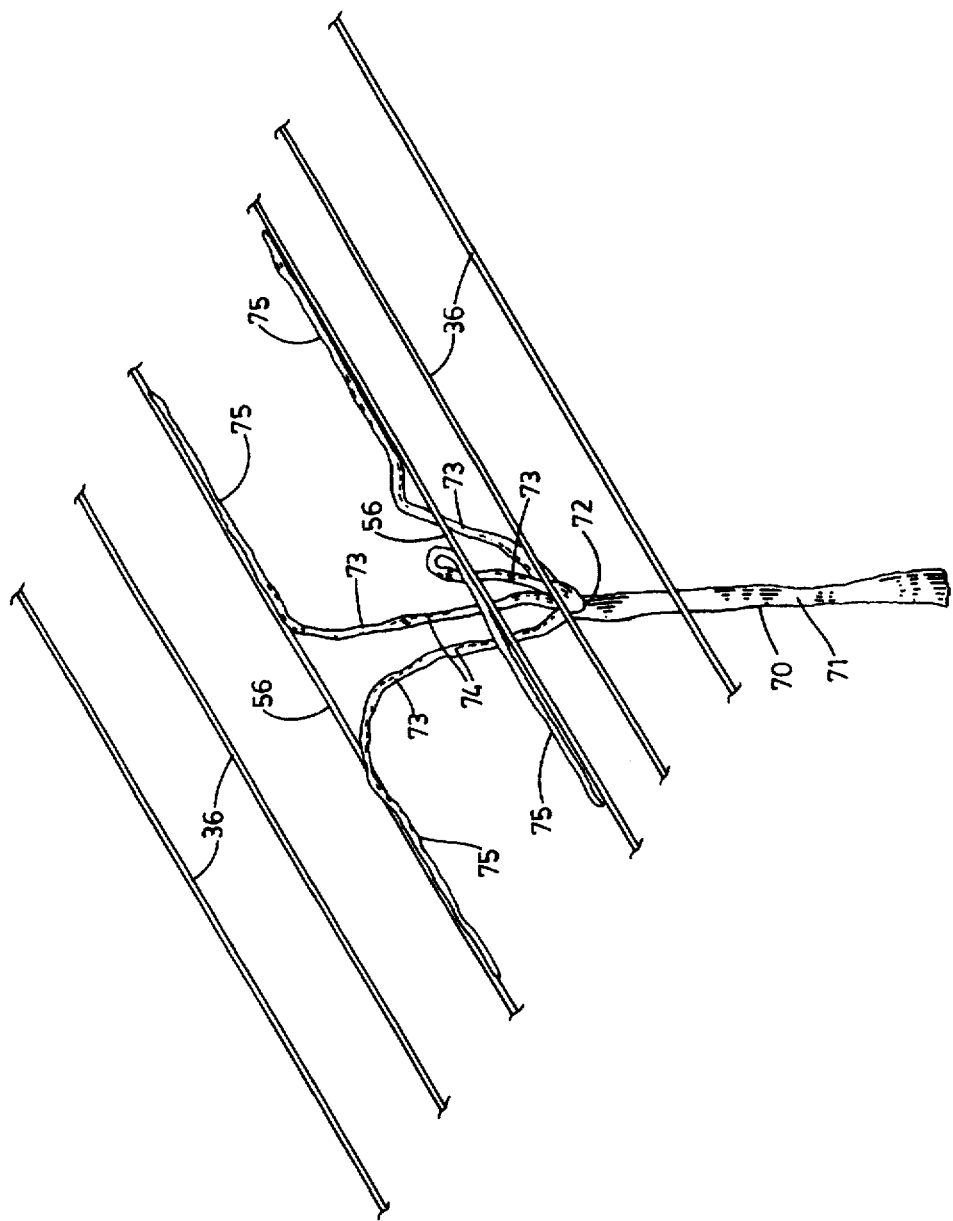
FIG. 5A is a somewhat enlarged, perspective view of a grapevine trained in accordance with the method of the present invention and supported on a portion of the apparatus of the present invention and illustrating a first stage of a transitional phase in converting the grapevine to the practice of the method hereof.

Referring then more particularly to FIG. 5A, the grapevine 70 produces cane which are trained by pruning to form four predetermined portions, primary subportions, or cordons 73. As will hereinafter be described, in some instances it may be desirable to form six cordons, but for illustrative convenience it will be assumed, in this illustrative embodiment, that four cordons are formed on each grapevine.

The cordons 73 are grown and, in effect, segregated to form two pair of cordons. One pair of cordons is trained to grow upwardly and then outwardly in the direction of the lower trellis wire 56 on the right, as viewed in FIG. 3. The other pair of cordons 73 is trained to grow upwardly and outwardly toward the trellis wire 56 on the left, as viewed in FIG. 3. The cordons of each pair are trained to grow in opposite directions along their respective trellis wire 56, as best shown in FIG. 5A. Each cordon has a proximal portion 74 extending from the crown 72 and a distal portion 75 extending along its respective trellis wire 56. The distal portion 75 of each cordon is tied on its respective trellis wire to hold the cordon in the described position thereon. As is evident from FIG. 5A, the proximal portions 74 of the cordons 73 of each pair are divergent from each other providing space therebetween. Similarly, the pairs of cordons 73 are divergent from each other toward their respective lower trellis wires 56. Thus, each cordon is spaced laterally from each of the other cordons of the grapevine, as best shown in FIG. 5A.

In some instances, it may be desirable to prune each grapevine to form two more cordons, one extending to each space between the cordons of each pair of cordons on each lower trellis wire 56. This is simply to fill the space therebetween in accordance with the method of the present invention.

Figure 5B:
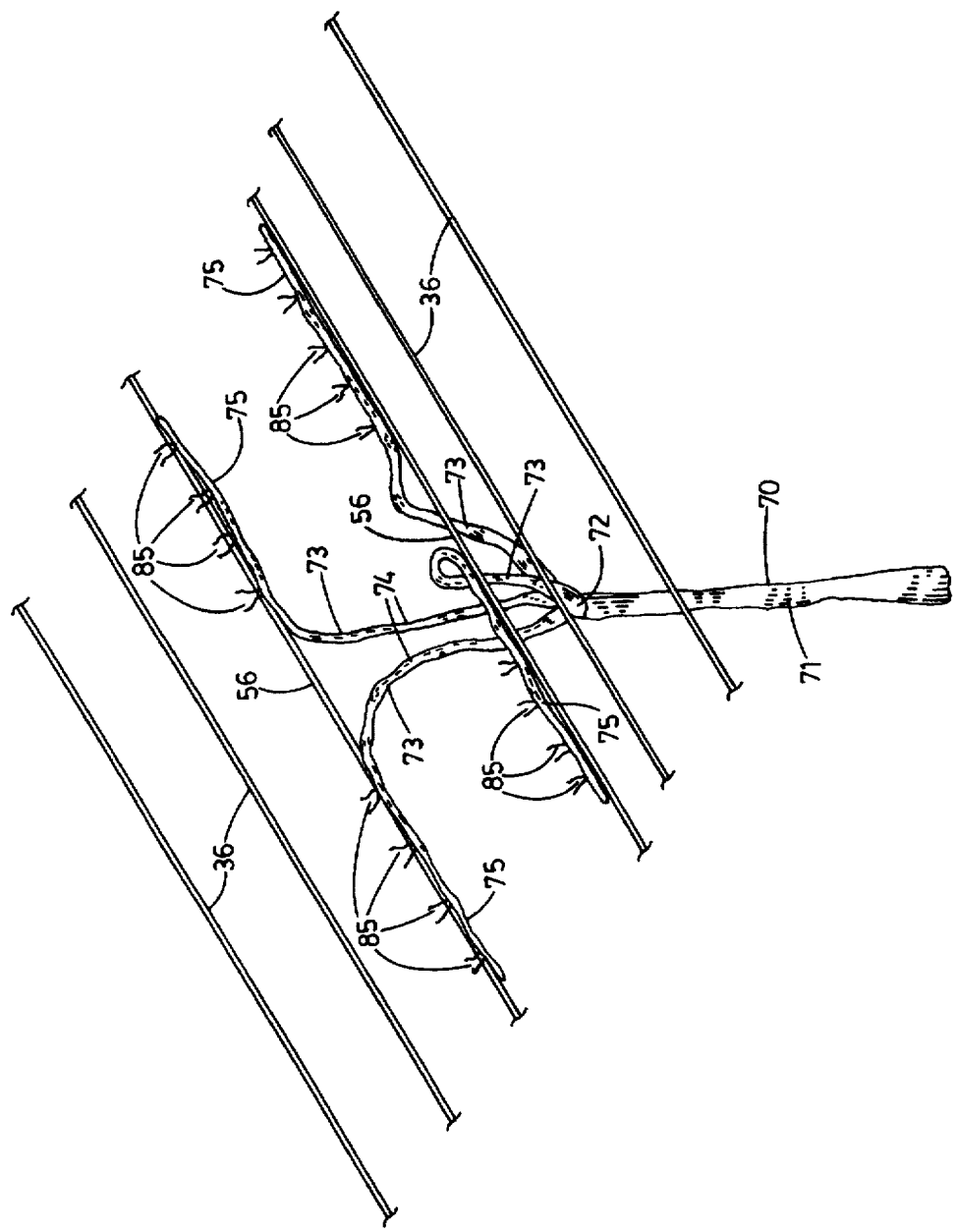
FIG. 5B is a fragmentary perspective view of the grapevine of FIG. 5A at a second stage of development in accordance with the method of the present invention.

Referring more particularly to FIG. 5B, in accordance with the method of the present invention, the grapevine 70 in the spring of the growing season produces a plurality of new shoots 85 from each of the cordons 73. The new shoots project from the distal portions 75 thereof. As shown in FIG. 5C, the new shoots 85 continue to grow through the spring and into the summer of the growing season of that year and become the young canes 86. For illustrative convenience, once the conversion to the method of the invention has been achieved, the young canes are sometimes referred to herein as "first year" or "second year" canes to distinguish those grown in one growing season from those grown in the next growing season. However, during this transitional phase, the young canes are of the same growing season. The young canes are draped over the overhead trellis wires 36 in side-by-side relation to each other and in substantially right angular relation to the distal portions 75 of their respective cordons 73. The young canes 86 are draped over progressively more of the overhead trellis wires 36 as they continue to grow. If necessary the young canes are tied in their positions so as to retain the arrangement generally shown in FIG. 5C. It will be noted that the young canes are thus trained to grow in opposite directions from the center line of the row 37, or, in other words, outwardly from their respective cordons laterally of the row.

Movement of the young canes 86 to the described positions in which they are draped over the overhead trellis wires is achieved using the control wires 38. As may best be visualized upon reference to FIG. 3, the control wires are moved in opposite directions from the positions shown in FIG. 3 away from the upper end portions 43 of the vertical members 41 into engagement with the young canes which grow generally upwardly from their respective cordons. The control wires are thus used, in effect, to fold the young canes over the overhead trellis wires 36 laterally of their respective row.

Figure 5D:
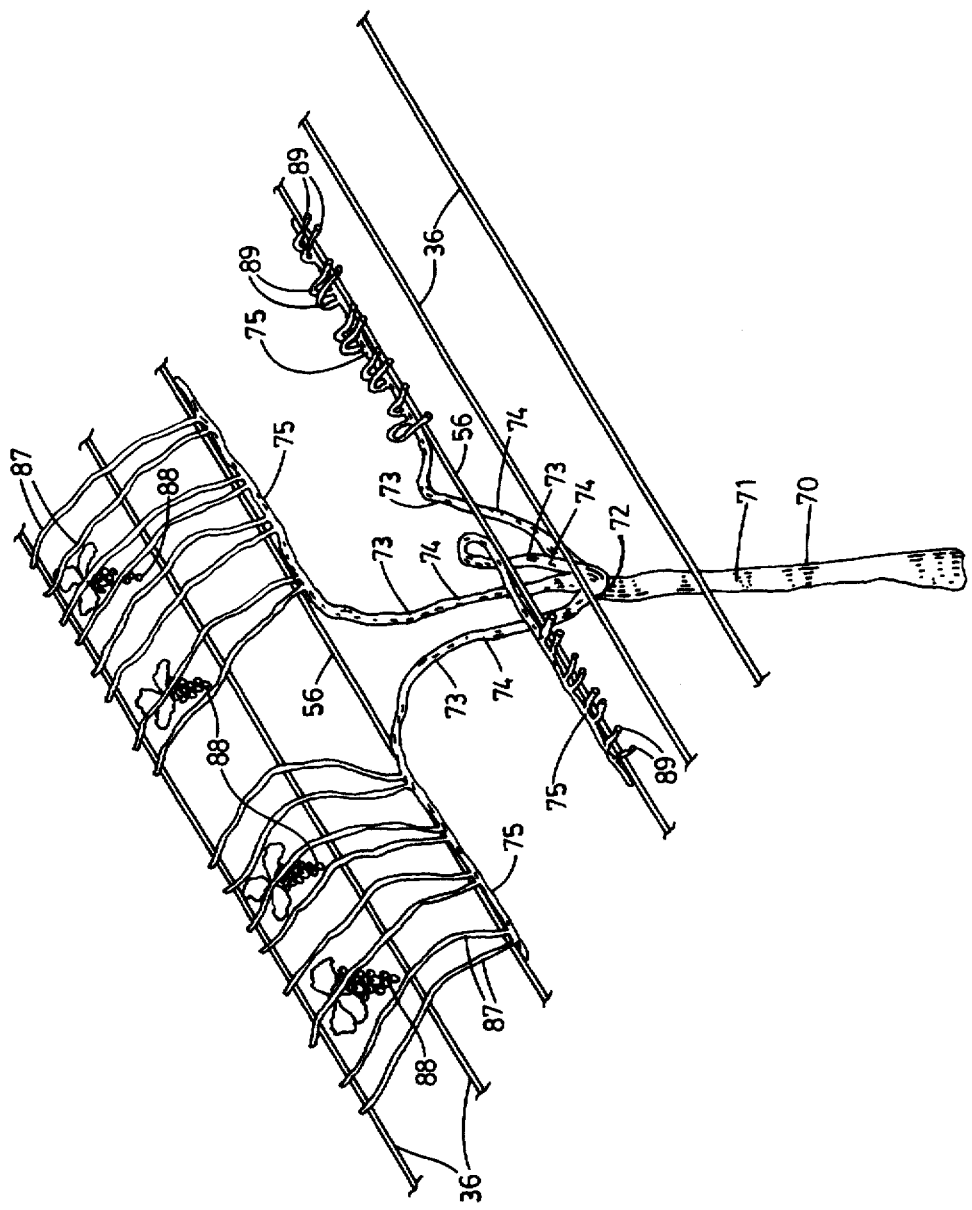
FIG. 5D is a fragmentary perspective view of the grapevine of FIGS. 5A, 5B and 5C at a fourth stage of development in accordance with the method and apparatus of the present invention.

Continuing with the transitional phase, and as may be visualized in FIGS. 5C and 5D, the young canes 86 are permitted to continue to grow and are trained in overlaying relation to the overhead trellis wires 36, as previously described. Ultimately in that first growing season, the young canes reach a state of maturity for that growing season. These young canes, or "first year", canes produce some fruit during this first growing season which can, of course, be harvested.

Subsequently, in the fall of that first growing season, a decision is made as to which side of each row is to become the side which will become the fruiting canes for the next growing season. As illustrated in FIG. 5D, the left side of the grapevine 70 has been selected for use as the fruiting canes for the next growing season. Similarly, the right side of the adjacent row 37 of grapevines on the left side of grapevine 70 is selected, in accordance with the method of the present invention, to be the fruiting side of the adjacent row. Conversely, the right side of the grapevine 70, and thus the right side of the row 37 in which grapevine 70 is present, becomes the nonfruiting side for the next growing season. Similarly, the left side of the adjacent row 37 to the right of the row in which grapevine 70 resides becomes the non-fruiting side for the next growing season. As a consequence of this decision, the canes produced by the cordons 73 on the left of grapevine 70 are left in position after harvest while the canes on the right side of grapevine 70 are severed using normal pruning techniques so as to retain only the spurs or severed canes 89 in position on their respective cordon 73 on the right of grapevine 70.

Figure 5E:
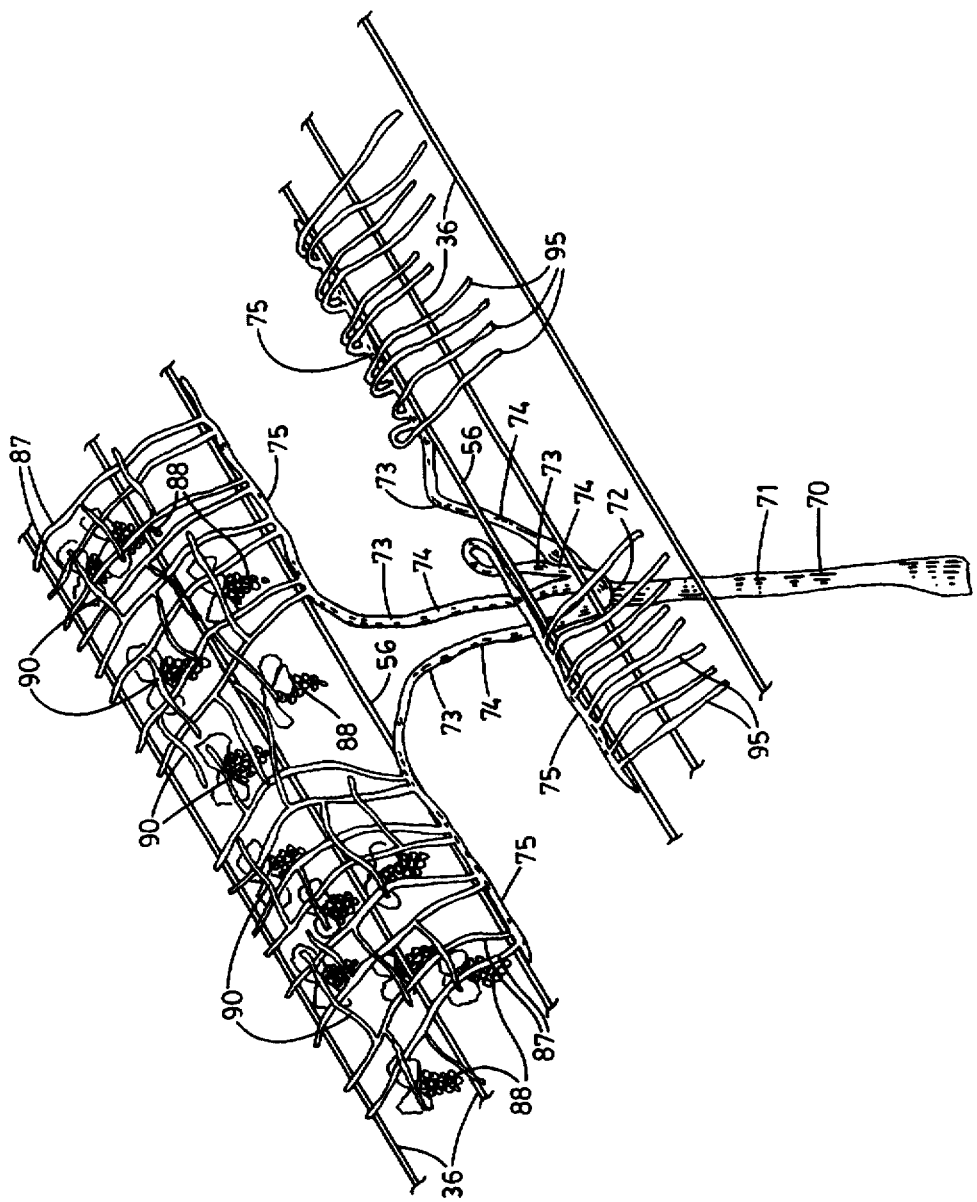
FIG. 5E is a fragmentary perspective view of the grapevine of FIGS. 5A, 5B, 5C and 5D at a fifth stage of development in accordance with the method and apparatus of the present invention.

In the second growing season, the severed canes 89 produce new shoots 85 similar to those shown in FIG. 5B, but extending to the right as shown in FIG. 5E. The new shoots 85 become young canes 86 and are trained in a manner similar to that previously described in that they are draped over the overhead trellis wires 36 to the right of grapevine 70 using the control wire 38. Similarly, of course, this is also done with the other grapevines in the representative row 37.

During this second growing season the now fruiting or second year canes, now identified for illustrative convenience by reference numeral 87, on the left of the grapevine 70 grow lateral canes 90, as shown in FIG. 5E, which produce the crop 88. The crop so produced is a full crop meaning that the crop volume is of commercial size and in accordance with normal year to year production after the transitional phase has been completed. This crop is permitted to grow and is harvested in accordance with the method of the present invention, as will hereinafter be described. The young canes 86 on the right of the grapevine 70 become first year or renewal canes 95 and are permitted to grow until they reach maturity during that second growing season.

Continuing to refer to FIG. 5E, when the lateral canes 90 of the second year canes 87 have produced their crop and that crop has been harvested, in accordance with conventional pruning techniques, the second year canes 87 are pruned or severed outwardly from the respective distal portions 75 of the cordon 73. This results in only the spurs or severed canes 89, remaining on their respective distal portions 75 on the left. The lateral canes 90 are, of course, removed with the second year canes 87 from which they have grown.

At this time, the first year or renewal canes 95 on the right side of the grapevine 70 of the representative row 37 shown in FIG. 5E are draped over the overhead trellis wires 36 so as to be in position to produce a crop during the subsequent growing season. Similarly, the adjacent row to the right of the respective row 37 in which grapevine 70 is positioned has first year or renewal canes 95 extending toward the representative row 37. This completes the conversion of the grapevine 70, and thus in the vineyard 11, in accordance with the method of the present invention for continual use on a seasonal basis thereafter.

FULLY OPERATIONAL PHASE

Continual usage of the vineyard 11, after such conversion, in accordance with the method may best be visualized upon reference to FIG. 1. As shown therein, the vineyard can be visualized as having a representative row of grapevines generally indicated by the numeral 96. It will be seen, as depicted therein, that the trellis structure 30 to the right of the representative row of grapevines constitutes a fruiting or crop production section 97 while the area of the trellis structure to the left thereof constitutes a renewal or noncrop production section 98. In other words, the fruiting or crop production section 97 is composed of second year canes 87 and lateral canes 90 extending from the representative row 96 and from the row to its immediate right which are capable of producing a full commercial crop of grapes 88. Conversely, the section 98 to the left of representative row of grapevines 96 is composed of first year or renewal canes 95 extending toward each other from the representative row 96 and from the next adjacent row 37 to the left of representative row 96.

Thus, once the grapevines 70 of the vineyard 11 have been convened to practice of the method, in one growing season, section 97 will be, as shown, the crop production section and section 98 will be, as shown, the noncrop production section. In the immediately succeeding growing season, section 98 will become the crop production section and section 97 will become the noncrop production section. This cycle is repeated from year to year for the life of the vineyard. It will also be understood that this relationship relative to representative row 96 is repeated throughout the vineyard so that the vineyard is composed of successive sections which are crop producing and noncrop producing sections throughout the width of the vineyard. The applicant's method is, for convenience, sometimes referred to as an "alternate bearing system" in that for any given row of grapevines, in one growing season all of the grapes produced by that row are on one side of the row of grapevines and in the immediately succeeding growing season the crop production is all on the opposite side of the row of grapevines. This has enumerable advantages, as will hereinafter be more specifically set forth.

Referring more particularly to FIG. 3, the harvesting techniques in accordance with the method of the present invention are hereinafter described. For illustrative convenience, it will be assumed, in this first such example of harvesting, that the crop which has been raised is table grapes or wine grapes and harvesting is to be manually performed. Accordingly, a field worker is depicted therein and is generally indicated by the numeral 100. The field worker is shown in FIG. 3 for purposes of illustrating the relative size of a human being in comparison with the elevation of the trellis structure 30 above the earth surface 13. As depicted therein for illustrative convenience, the field worker has ready access to the fruit 88 borne by the lateral canes 90 of the second year canes 87. Harvesting is simply preformed in a manual operation by using a conventional knife to cut the stems of the bunches of grapes and remove the bunches of grapes for collection by any suitable means in accordance with the specific harvesting procedure being preformed. The bunches of grapes are suspended in pendant relation gravitationally beneath the trellis structure and thus separated from the canes and foliage of the grapevines so that substantially only the fruit is exposed and is therefore readily accessible for harvest. Thus, using the method of the present invention, it is virtually impossible to inadvertently miss harvesting bunches of grapes and, similarly, it is fully evident to what point harvesting is progressed within a given section since the grapes in themselves demarcate the unharvested portion of the grapevines.

Similarly, harvesting can be preformed with the method of the present invention using automated harvesting techniques. The particular harvesting equipment employed is dependent solely upon the preferences of the operator. The particular mechanical harvester employed passes beneath the trellis structure 30 along the path 15 between the rows 37 of grapevines in preforming the harvesting operation. Since the height of the trellis structure is as previously identified, the mechanical harvesting operation can be preformed quite readily from beneath the trellis structure.

Similarly, the other horticultural practices required in the raising of the grapevines 70 and in crop production can readily be preformed as facilitated by the method of the present invention and the apparatus hereof. For example, since the foliage, canes and crop of the grapevines are fully exposed, as previously described, the use of spray equipment, for the application of a wide variety of types of substances is facilitated. Furthermore, as can be seen in FIG. 3, the portions of the second year canes 87 adjacent to their respective cordons 73 are fully exposed and thus readily available for severing, or pruning, once the crop has been harvested and otherwise in accordance with proper viticultural practice.

Similarly, in the same manner, the production of "dried on the vine" raisins, which require severing of the canes so that the grapes are dried on the vine to form raisins can readily be preformed by severing the canes in the same manner. Where such "dried on the vine" production techniques are employed to produce raisins, it is frequently the case that the grapes must be sprayed with a substance such as methyl oleate to promote drying on the vine. This operation is also facilitated in the method of the present invention by the virtually complete exposure of the crop beneath the trellis structure. Thus, the fruit itself is completely exposed to spray material for the achievement of the particular operative objective and is otherwise more fully exposed to sunlight thus facilitating the drying process. Harvesting can be performed by either manual or fully automated techniques as previously described in the case of table and wine grapes.

A multiplicity of other operative advantages result from the use of the method and apparatus of the present invention. Since the canes of the grapevines are distributed in a canopy over substantially all of the vineyard floor, there is an optimum admission of light to all portions of the grapevines. This increases light interception and reduces canopy density for all of the benefits associated therewith, including the spraying of airborne materials, air circulation and a greater exposure of leaf area for purposes of photosynthesis. It has been found that the segregation of the canes of the grapevines based upon the year of growth increases crop yield due to the improvement of solar radiation relative to the buds. This greater exposure increases the crop production. Since the crop is supported in pendent relation, it is automatically gravitationally segregated from the overhead trellis wires 36 of the trellis structure. The segregation of the trellis wires from the crop facilitates mechanized harvesting of the crop since the trellis wires are unlikely to interfere with the passage of the harvesting equipment.

As noted, the method and apparatus of the present invention make commercially feasible the production of "dried on the vine" raisins in the manner previously described. The raisins so produced are of substantially better quality than that which has heretofore been possible due in part to the fact that the fruit hangs freely separated from the canes and foliage of the grapevines. This allows not only a greater exposure to sunlight, which improves the quality of the grapes, but also avoids many of the adverse consequences of exposure to rain, dust, insects and the like, which materially reduce the quality of raisins produced in accordance with conventional methods. By contrast, in the method and apparatus of the present invention, moisture falling on the grapes readily dries due to the enhanced air circulation and exposure to sunlight. Similarly, since the grapes dry on the vine beneath the trellis structure, their exposure to dust is significantly reduced from that experienced where, for example, the grapes are dried on trays rested on the earth's surface. Similarly, there is less opportunity for insects, other pests, or contaminants to become intermixed with the fruit during the drying process. Since no trays are used in the drying of the grapes, there is no need to burn trays after the drying process has been completed in order to dispose of them. This avoids the environmental pollution associated with such disposal procedures.

Finally, the segregation of the fruiting canes from the renewal canes, in accordance with the method and apparatus of the present invention, has still other operative benefits which ensure substantially greater crop production than has heretofore been possible at substantially less expense than has previously been possible. It is known in the production of table grapes that crop production is enhanced by girdling the grapevines and by spraying the fruit with gibberellic acid. Girdling retains more of the plant nutrients for use by the fruiting canes than would otherwise be the case. Gibberellic acid is a growth hormone which is used at one stage to thin the crop and at another stage to improve fruit size. It is also known, however, that girdling has adverse affects such as restricting growth of the grapevines. Similarly, it is known that gibberellic acid has adverse affects such as burning buds of the renewal canes.

In accordance with the method of the present invention, girdling is performed only on the fruiting canes and not on the renewal canes. Since, as previously described, the fruiting canes are segregated from the renewal canes in the method and apparatus of the present invention, this process is readily performed. Similarly, gibberellic acid is only applied to the fruiting canes and not to the renewal canes. As a consequence, in the practice of the method and apparatus of the present invention all of the benefits of the use of girdling and gibberellic acid are obtained and all of the detriments of their use are avoided. This is not possible with prior art methods and apparatuses.

Therefore, the method and apparatus of the present invention are particularly well suited to the commercial production of such crops as grapes, raisins and other commercial crops produced by plant life having a proclivity to uncontrolled growth; employ the natural botanical growth characteristics of the plants in such a manner as most beneficially to achieve the operational objectives desired; facilitate the ease with which all of the horticultural practices required in the raising of plants can be preformed; enhance the quality and commercial appeal of the crop produced thereby; can be employed in both new and existing vineyards; and are otherwise entirely successful in achieving their operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A method for raising grapevines which can be trained to grow at least one trunk, at least one cordon, a plurality of canes and a crop borne by said canes during a growing season, the method comprising the steps of:

A. growing a plurality of said grapevines in the earth arranged in substantially parallel rows of said grapevines with the trunks thereof extending generally upwardly from the surface of the earth within their respective rows;

B. segregating portions of each of said grapevines to form four cordons;

C. training said four cordons of each of said grapevines to grow along a pair of substantially parallel courses individually laterally disposed relative to said row with said four cordons arranged in two pairs so that the cordons of each pair of cordons are trained to grow in substantially opposite directions along one of said pair of courses;

D. extending said canes produced by each cordon of each grapevine laterally of said course and the row thereof and in spaced relation to the earth surface over a trellis structure extending substantially the full distance between adjacent rows of said grapevines so that the canes produced by the four cordons of the grapevines of the rows extend in substantially side-by-side relation from their respective cordons over said trellis structure between said adjacent rows of said grapevines and generally toward the canes of the grapevines of the adjacent row in spaced relation to the earth surface; and E. growing said crop in pendant relation from the canes extending generally in the direction of the earth surface from said trellis structure.

2. The method of claim 1 in which the grapevines produce foliage substantially only on the canes thereof and wherein in said training step said courses of said pair of parallel courses are spaced from each other a distance sufficient that the cordons trained to grow along said courses are spaced from each other a distance sufficient to permit substantial light to pass therebetween without obstruction by said foliage.

3. The method of claim 1 wherein in said growing step adjacent rows of grapevines are spaced from each other a distance sufficient that in a growing season the canes of adjacent rows do not overlap over substantial portions thereof.

4. The method of claim 1 wherein in said extending step the canes are spaced from each other a distance sufficient to permit a substantial passage of light therethrough.

5. The method of claim 1 in which the canes first produced by a cordon in a given growing season do not produce a substantial crop until the next growing season and including the step of:

F. severing the canes which have produced a crop after harvesting said crop therefrom while leaving the canes on the cordons which have not produced a substantial crop through the next growing season and until they have produced a substantial crop.

6. The method of claim 5 wherein said severing step includes severing the canes on a seasonal basis so that adjacent rows of said grapevines in a given growing season have canes extending from their respective cordons generally toward each other between said adjacent rows of grapevines which were grown in the same growing season.

7. The method of claim 6 wherein said growing step includes growing said grapevines in a plurality of parallel rows with each adjacent pair of rows bounding a space therebetween and wherein the severing step includes severing the canes on a seasonal basis so that adjacent spaces have canes extending therebetween in their respective spaces which were first grown in different growing seasons whereby for any given row in any given growing season the space on one side thereof has substantially only canes which will bear said substantial crop and on the other side thereof has substantially only canes which will not bear said substantial crop.

8. The method of claim 5 including the step of:

G. applying crop enhancing techniques to the canes which will produce said substantial crop in said growing season and not to the canes which will not produce a substantial crop in said growing season thereby obtaining substantially all of the benefits of said crop enhancing techniques and substantially none of the detriments thereof.

9. The method of claim 1 wherein said trellis structure is spaced from the earth a distance sufficient to permit a human being to pass therebeneath and including the step of:

F. harvesting said crop from the canes which are extended over said trellis structure during passage beneath the trellis structure.

10. A method for raising grapevines which can be trained to grow at least one trunk, at least one cordon, a plurality of canes and a crop borne by said canes during a growing season, the method comprising the steps of:

A. growing a plurality of said grapevines in the earth arranged in a plurality of substantially parallel rows with each adjacent pair of rows bounding a space therebetween and with the trunks thereof extending generally upwardly from the surface of the earth within their respective rows;

B. segregating portions of each of said grapevines to designate four cordons;

C. training said four cordons of each of said grapevines to grow along a pair of substantially parallel courses individually laterally disposed relative to said row with said four cordons arranged in two pairs so that the cordons of each pair of cordons are trained to grow in substantially opposite directions along one of said pair of courses;

D. extending said canes produced by each cordon of each grapevine laterally of said course and the row thereof and in spaced relation to the earth surface so that the canes produced by the four cordons of the grapevines of the rows extend in substantially side-by-side relation from their respective cordons and generally toward the canes of the plants of the adjacent row in spaced relation to the earth surface; and E. severing the canes on a seasonal basis so that adjacent spaces have canes extending therebetween in their respective spaces which were first grown in different growing seasons whereby for any given row in any given growing season the space on one side thereof has substantially only canes which will bear said crop and on the other side thereof has only canes which will not bear said crop.

11. The method of claim 10 wherein in said extending step said canes from adjacent rows are extended generally toward each other over said space therebetween supported by a trellis structure disposed in spaced relation to the earth and extending over substantially said entire space between said adjacent rows.

* * * * *

UNITED STATES PATENT AND TRADEMARK OFFICE
CERTIFICATE OF CORRECTION

PATENT NO. : 5,711,109
DATED : January 27, 1998
INVENTOR(S) : GARY R. PITTS

It is certified that error appears in the above-identified patent and that said Letters Patent is hereby corrected as shown below:

Column 8, line 25, delete "convened" and substitute

---converted---.

Signed and Sealed this

Seventh Day of April, 1998

Attest:

BRUCE LEHMAN

Attesting Officer

Commissioner of Patents and Trademarks